Patented Sept. 1, 1936.

2,052,614

UNITED STATES PATENT OFFICE 2,052,614

NITRATION OF DIBENZANTHRONE COMPOUNDS

Maurice H. Fleysher, Buffalo, N. Y., assignor to National Aniline and Chemical Company, Inc., New York, N. Y., a corporation of New York No Drawing. Application April 27, 1935, Serial No. 18,689

10 Claims. (Cl. 260—61)

This invention relates to improvements in the manufacture of nitro-dibenzanthrone dyes and particularly to the nitration of dibenzanthrone and isodibenzanthrone in the presence of an inert reaction medium.

The nitrated dibenzanthrone compounds obtained, for example, by the nitration of dibenzanthrone or isodibenzanthrone are usually applied to textiles in the reduced state, e. g. from a hydrosulfite vat, and then oxidized on the fibers by treatment with an oxidizing agent, such as sodium hypochlorite, for example, to yield black dyeings which are of exceptional fastness, including fastness to the action of chlorine.

In order to secure uniformity of reaction conditions, it has heretofore been proposed to effect the nitration of dibenzanthrone in the form of a slurry in nitrobenzene. To obtain such a slurry in a state of sufficient fluidity to attain the desired results, it is necessary that a large quantity of the nitrobenzene be employed. Thus an amount of nitrobenzene six to ten times as large as the amount of dibenzanthrone to be nitrated is required.

It will be evident that by reducing the amount of reaction or dispersion medium present, the capacity of equipment for carrying out the process as well as the power and heat requirements for agitation and distillation might be very materially reduced. Not only might the size of reaction vessels, agitators, and storage facilities be reduced, but also the size of separatory apparatus and recovery apparatus might be proportionately diminished. The reaction medium is normally recovered by steam distillation and the stills and steam supply must be capable of handling a quantity of nitrobenzene six to ten times that of the product with which the process is primarily concerned,—namely dibenzanthrone or isodibenzanthrone.

I have now made the discovery that by using orthonitrotoluene as the reaction medium in the above reaction, the fluidity of the reaction mixture is very materially improved, to such an extent, in fact, that only one-half to one-third as much of the reaction medium is required for efficient operation as with nitrobenzene. Advantage of the increased fluidity may be taken also to obtain more effective stirring and more constant and uniform nitration conditions. Obviously the benefits of smaller equipment size resulting from the process of the present invention are reflected in reduced apparatus cost and reduced placement space requirements, thus diminishing overhead, while at the same time the smaller quantities of materials involved reduce direct expenses chargeable to heat and power requirements.

The improvement obtainable by the use of o-nitrotoluene as a dispersion medium in the nitration process is all the more surprising when it is considered that under normal conditions the viscosity of o-nitrotoluene is greater than that of nitrobenzene. Thus at 20° C. the specific viscosity of nitrobenzene (water at 0°=100) is about 114 and that of o-nitrotoluene is about 130.9, while at 50° C. the specific viscosity of nitrobenzene is 69.8 and that of o-nitrotoluene is 76.5. That the fluidity of the reaction mass would be increased by substitution of o-nitrotoluene for nitrobenzene was therefore contrary to the result that one would expect from the comparative viscosities of these compounds.

It may be mentioned further that in addition to the above advantages of using o-nitrotoluene as a dispersion medium, the low toxicity of this compound as compared with nitrobenzene tends to diminish the industrial hazards of the process.

In the preparation of nitrodibenzanthrone black dyes by the nitration of dibenzanthrone, by means of nitric acid, in accordance with the present invention, powdered dibenzanthrone which may be in the pure or crude state, as desired, may be mixed with from about 2½ to 5 times its weight of o-nitrotoluene to form a slurry. As above noted, despite the fact that o-nitrotoluene has a much higher viscosity than nitrobenzene the slurry of dibenzanthrone which is made therewith has a much greater fluidity than a corresponding slurry made with an equal quantity of nitrobenzene. This unexpected result is probably due to the difference in solubility relationships between the dibenzanthrone and the respective reaction media but in any case the increase in fluidity is sufficient to permit a substantial reduction of the amount of such medium which is required to effectively control the nitration.

The slurry of powdered dibenzanthrone in o-nitrotoluene may be treated with nitric acid in amount sufficient to nitrate the dibenzanthrone to the desired extent, the specific amount and concentration of the nitric acid used in any particular case being, as will be appreciated by those skilled in the art, dependent upon the extent of nitration desired.

After completion of the nitration, the reaction mixture may be neutralized and the o-nitrotoluene steam-distilled therefrom. The o-nitrotoluene thus recovered may be used in the treatment of further quantities of dibenzanthrone.

Preferably a proportion of o-nitrotoluene on the order of 3½ parts of o-nitrotoluene for each part of powdered dibenzanthrone is used to prepare a slurry thereof. To the resultant slurry nitric acid of 50% to 95% concentration is slowly added, the temperature of the nitration mixture being regulated meanwhile so that it does not rise substantially above 25° C. during the early part of the nitration, say for the first 3 hours or so. It is advantageous to maintain the temperature between about 20° and 25° C. It is desirable that the mixture undergoing reaction be well agitated throughout the nitration process and because of the mobility thereof, resulting from the use of o-nitrotoluene, the mixture may be easily and efficiently agitated and the regulation of the temperature within the desired limits may be easily obtained.

After the reaction at low temperature is substantially completed, the temperature may be raised to 45° to 65° C. to effect further nitration, this temperature being maintained for a sufficient time to complete the desired reaction. Thereupon a suitable alkali, for example sodium carbonate, may be added to neutralize the nitric acid present. The alkaline reaction product may be subjected to steam distillation to drive off o-nitrotoluene and the residual reaction mixture may be acidified, preferably by admixture with sulfuric or hydrochloric acid, and the nitrated dibenzanthrone filtered from the solution. The crude product thus obtained may be purified in any desired manner.

The process may be applied to pure dibenzanthrone or to crude dibenzanthrone products, for example, products prepared in accordance with the disclosure of U. S. Patent 1,734,442, and it will be understood that while it is preferred that the present invention be applied to the entire nitration process, the benefits thereof may be obtained by application of the invention to one or more stages of the nitration when it is effected as a multi-stage process. Thus, without exceeding the scope of my invention a part of the nitration might be effected by prior known methods and only a part thereof effected in the presence of o-nitrotoluene, as herein described.

*Example.*—About 333 parts of powdered dibenzanthrone were suspended in about 1200 parts of ortho-nitrotoluene. The slurry thus formed was well stirred, the temperature thereof regulated to about 15°–20° C., and about 275 parts of about 70% nitric acid were added thereto. The rate of addition of the nitric acid was so regulated that the temperature of the reaction mixture did not rise above about 25° C. After all the nitric acid was added, the agitation of the reaction mixture was continued for about three hours, the temperature being maintained between 20° and 25° C. At the end of this time the temperature of the reaction mixture was raised gradually over a period of two hours to between 50° and 65° C. and stirring was continued at the higher temperature for an additional eighteen hours. About 160 parts of sodium carbonate (Na₂CO₃) were then added and the alkaline mixture was steam-distilled to remove the ortho-nitrotoluene therefrom. The residual liquid was acidified by the addition of sulfuric acid thereto and the nitrated dibenzanthrone removed on a filter, washed with hot water, then with hot dilute sodium carbonate solution, and finally, again with hot water.

The resultant product, in a hydrosulfite vat, dyes cotton green. Upon treatment with hypochlorite, the green dyeing is converted to a dull, deep, reddish-black shade.

I claim:

1. In the nitration of a member of the group consisting of dibenzanthrone isodibenzanthrone, the improvement which comprises effecting nitration in the presence of o-nitrotoluene.

2. In the preparation of nitrated dibenzanthrone, the improvement which comprises effecting nitration in a dispersion medium consisting essentially of o-nitrotoluene.

3. The method of nitrating dibenzanthrone, which comprises subjecting dibenzanthrone to the action of concentrated nitric acid in the presence of o-nitrotoluene.

4. The method of nitrating isodibenzanthrone, which comprises treating isodibenzanthrone with concentrated nitric acid in the presence of o-nitrotoluene.

5. In the nitration of dibenzanthrone, the improvement which comprises effecting the nitration of the dibenzanthrone as a slurry thereof in o-nitrotoluene, the weight of the o-nitrotoluene being from about 2½ to about 5 times the weight of the dibenzanthrone used.

6. The method of nitrating dibenzanthrone, which comprises subjecting dibenzanthrone to the action of nitric acid in the presence of o-nitrotoluene, the amount of the o-nitrotoluene used being from about 2½ to about 5 parts by weight of the dibenzanthrone used.

7. The method of nitrating dibenzanthrone, which comprises subjecting dibenzanthrone to the action of concentrated nitric acid in the presence of o-nitrotoluene in a weight ratio of 3½ of o-nitrotoluene to one of dibenzanthrone.

8. The method of nitrating dibenzanthrone, which comprises subjecting dibenzanthrone to the action of aqueous nitric acid of a concentration between about 50% and about 95% HNO₃ at a temperature below about 25° C. in the presence of o-nitrotoluene.

9. The process for producing nitrated dibenzanthrone which comprises nitrating a slurry of dibenzanthrone in o-nitrotoluene, and separating the o-nitrotoluene from the nitrated dibenzanthrone by steam distillation.

10. A process for producing nitrated dibenzanthrone which comprises mixing about one part by weight of powdered dibenzanthrone with aqueous 70% nitric acid at a temperature below about 25° C. in the presence of about 3½ parts by weight of o-nitrotoluene, stirring the reaction mixture for about three hours after the addition of nitric acid thereto, at a temperature of about 20° to 25° C., raising the temperature of the reaction mixture to about 50° to 65° C., and thereafter stirring the mixture for about eighteen hours at this temperature, making the reaction mixture alkaline by the addition thereto of soda ash, steam distilling the alkaline mixture to recover o-nitrotoluene therefrom, acidifying the residual liquid, and separating the nitrated dibenzanthrone therefrom.

MAURICE H. FLEYSHER.